United States Patent

Barrager et al.

[15] 3,706,926

[45] Dec. 19, 1972

[54] METHOD AND APPARATUS FOR TESTING BATCH FABRICATED MAGNETIC HEADS DURING MANUFACTURE UTILIZING MAGNETIC FIELDS GENERATED BY OTHER MAGNETIC HEADS

[72] Inventors: Stephen M. Barrager, Palo Alto, Calif.; Geoffrey Bate, Boulder; Sidney H. Smith, Broomfield, both of Colo.

[73] Assignee: International Business Machines Corporation, Armonk, N.Y.

[22] Filed: June 4, 1971

[21] Appl. No.: 149,976

[52] U.S. Cl.......................324/34 R, 29/593, 29/603, 179/100.2 B

[51] Int. Cl...............................................G01r 35/00

[58] Field of Search...............324/34 R; 29/593, 603; 179/100.2 B

[56] References Cited

UNITED STATES PATENTS 3,375,439 3/1968 Yamamoto .........................324/34 R
3,417,465 12/1968 Glass..............................324/34 R X
3,564,521 2/1971 Trimble et al. .......................29/603

OTHER PUBLICATIONS

Frese, S. J., Inductive Tape Synthesizer for R. W. Head Testing; IBM Tech. Bull; Vol. II, No. 8; Jan. 1969; pp. 1043–1044

*Primary Examiner*—Robert J. Corcoran
*Attorney*—Hanifin and Jancin and Gunter A. Hauptman

[57] ABSTRACT

Magnetic head elements are batch fabricated on areas of a substrate. During manufacture, and before final separation and processing of the areas into discrete multi-track magnetic heads, defective areas are identified for removal. An electric signal source subjects the head areas to a magnetic field which is detected as electric current in each head area. The detected current value in acceptable head areas falls within a predefined range. All head areas having a current outside the range are defined as defective. The magnetic field emanates from one set of head areas in the vicinity of another set of head areas being tested.

10 Claims, 20 Drawing Figures

METHOD AND APPARATUS FOR TESTING BATCH FABRICATED MAGNETIC HEADS DURING MANUFACTURE UTILIZING MAGNETIC FIELDS GENERATED BY OTHER MAGNETIC HEADS

CROSS-REFERENCES

Ser. No. 149,974, "Skewed High Density Magnetic Head and Method of Manufacturing Same," by G. Taylor, describes a head disclosed herein.

Ser. No. 149,973, "Method of Forming Gaps for Small Magnetic Heads," by G. W. Brock and R. Stephens, describes a method of manufacturing a head disclosed herein.

Ser. No. 149,975, "Batch Fabricated Magnetic Head Tester and Testing Method," by S. M. Barrager and S. H. Smith, describes a tester and testing method.

BACKGROUND OF THE INVENTION

1. Field of the Invention

The invention generally relates to electronic data processing and, more particularly, to testing electronic components during manufacture.

2. Description of the Prior Art

Relatively inexpensive fabrication of high precision magnetic heads used for high density recording of information on tapes, disks, drums, etc., has become possible using batch-fabrication techniques. Typically, a foil sheet is cut to form a plurality of head elements, or an insulator acts as a substrate for successive layers of magnetic, conductive, and insulating materials. In the latter technique, complex patterns are formed by deposition, evaporation, masking, etching, bonding, etc. For example, a plurality of head elements has been formed on a single substrate by applying a magnetic layer to the substrate, a conductive layer over the magnetic layer, and a second magnetic layer over the conductive layer. Suitable masking and etching steps provide separate elements each having a conductor surrounded by a magnetic path terminating in a read/write gap. In the prior art, the individual elements are separated, by cutting the substrate, finished, and then tested to determine if their electrical and magnetic characteristics are within predetermined acceptable standards. Failure of one element to meet the standards usually indicates that all other elements from the same batch will also fail to meet the standards because the defect occurred in the cutting, deposition, masking, etching, etc. In the prior art, early detection of defects has been attempted to prevent unnecessary processing of large numbers of unusable parts. Such testing includes visual inspection of surfaces, chemical analysis of samples, dimensional measurements, etc. However, the correlation between such tests and the electrical and magnetic characteristics of completed elements is poor.

"Batch Fabricated Magnetic Head Tester and Testing Method," by S. M. Barrager and S. H. Smith, discloses that rows of magnetic head elements on a substrate are tested during manufacture by passing a current through an extra conductive strip placed for testing purposes only on the substrate in the vicinity of the head element rows to be tested. The resulting magnetic field is detected in the head elements as a current which is compared to a predefined acceptable current.

SUMMARY OF THE INVENTION

The extra conductive strips of "Batch Fabricated Magnetic Head Tester and Testing Method," are eliminated by this invention. During the manufacturing process, a magnetic layer is applied to the substrate in association with conductive layers. The conductive layers are masked or etched to form conductive areas for each head element. Electrical contacts are provided for selectively connecting one or more of the element conductors in one set of head elements and one or more of the element conductors in a second set of head elements to a source of electrical signals. Electrical signals are applied to either set causing a magnetic field which intersects the other set. A signal caused by the field is amplified and compared to a predetermined signal value. If the comparison is within predefined values, the tested element conductors and magnetic layers are acceptable. In the case of multi-layer thin film heads, the test may be performed for one magnetic layer and repeated when the second film is deposited, or may be performed for the first time at that point in the process.

The foregoing and other features and advantages of the invention will be apparent from the following more particular description of preferred embodiments of the invention, as illustrated in the accompanying drawings.

DETAILED DESCRIPTION OF THE INVENTION

A transducer records information as magnetic areas on a medium by translating electrical signals into magnetic fields. The same transducer may also detect magnetic areas on a medium and translate them into electrical signals. Such transducers, commonly called magnetic read/write heads, usually operate by sensing the change in flux of a magnetic medium moving past the transducer. It is not essential that the medium move past the head, it being possible to move the head—the only requirement is that there be relative motion between the medium and the transducer to gain access to successive bits. A high bit density is considered to be 10,000 flux changes per inch (fci) and a high track density is considered to be between 500 and 2,000 tracks per inch at a high data rate of approximately 2.5 megahertz (MHz).

Magnetic Head Structure (FIGS. 1–3)

Figure 1A:
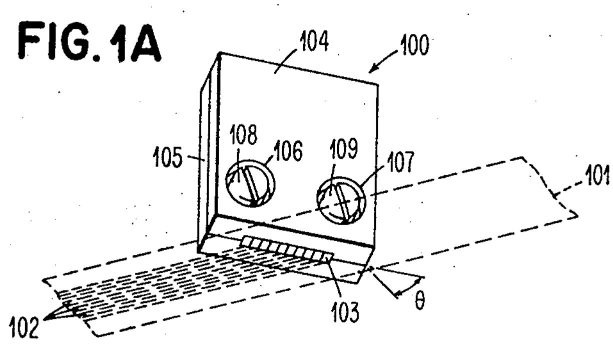
FIG. 1A shows a read/write head assembly for reading and writing information stored on a magnetic tape medium.

In order to obtain the desired high bit density, high track density and high data rate, it is desirable to operate the magnetic read/write head in a semitransverse mode. That is, the head is not necessarily mounted perpendicular to the relative motion between the head and the media. Referring first to FIG. 1A, there is shown a magnetic read/write head assembly 100 (for simplicity referred to as a magnetic head) mounted at an angle $\theta$ relative to a line across a magnetic tape 101. The magnetic head 100 is a transducer element 103 comprising a plurality of gaps each corresponding to a track 102 on the tape 101. As will be explained, the transducer element is a batch-fabricated thin film, foil strip or sheet, wherein each gap is defined by a slot, fastened between subassemblies 104 and 105 by fasteners 108 and 109 placed through fastening holes 106 and 107. As shown in more detail with reference to FIGS. 2A through 2E, the angle $\theta$ determines the number of tracks 102 which may be recorded on the magnetic tape 101 and the spacing and width of these tracks.

Figure 1B:
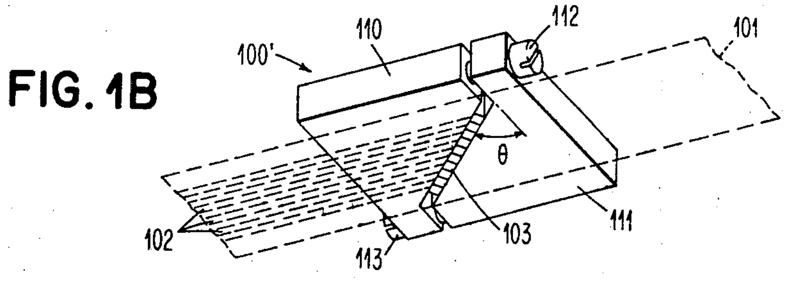
FIG. 1B shows another embodiment of a read/write head assembly for reading and writing information stored on a magnetic tape medium.
Figure 1C:
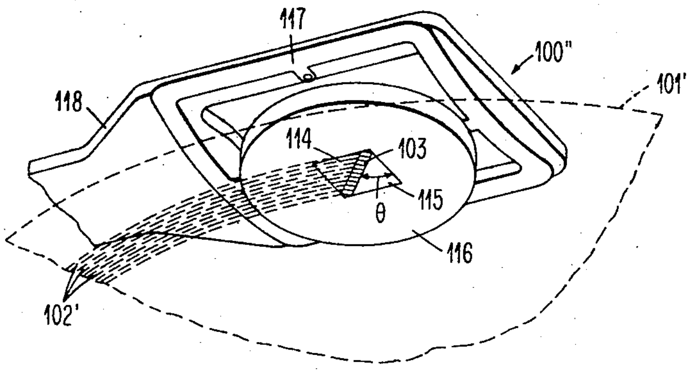
FIG. 1C shows a read/write head assembly for reading and writing information stored on a magnetic disk medium.

FIGS. 1B and 1C show two different embodiments 100′ and 100″ of the magnetic head 100 of FIG. 1A. Referring first to FIG. 1B, the magnetic head 100′ differs from the head 100 primarily in the subassemblies fastening the element 103 in position across the magnetic tape 101. The subassemblies 110 and 111 are held together by fasteners 112 and 113. The subassembly of FIG. 1B provides a surface with a lower profile than that of FIG. 1A. Referring now to FIG. 1C, a flying arm 118 supports the head 100″ to provide a floating structure capable of reading magnetic tracks 102′ on a rotating magnetic disk 101′. The element 103 is mounted at an angle $\theta$, relative to a line through the arm 118, in a mounting comprising sections 114 and 115 centered in a holder 116 which is loaded onto the arm 118 by the spring 117.

Figure 2B:
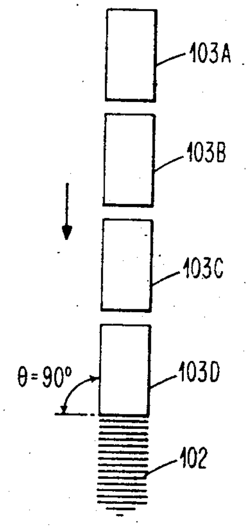
FIGS. 2A through 2E diagrammatically show the tracks on which information may be recorded by a read/write head positioned at varying angles relative to a medium.
Figure 2A:
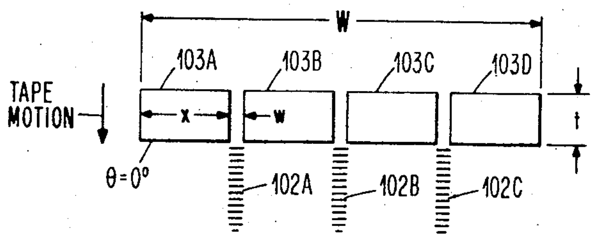
Figure 2C:
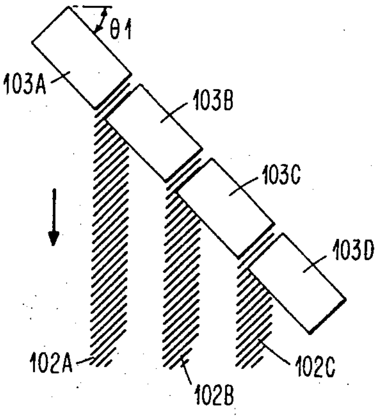
Figure 2D:
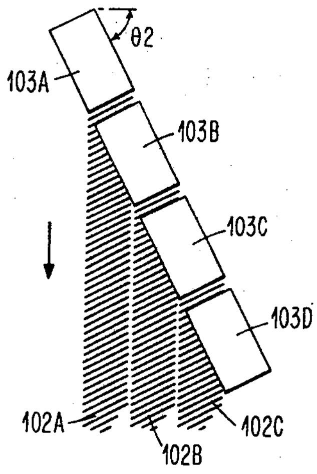
Figure 2E:
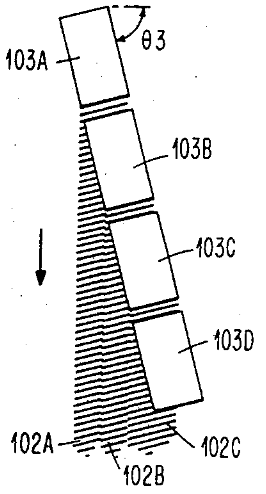

Referring now to FIGS. 2A through 2E, there are shown, in end views, details of the element 103 and the tracks 102 on the tape 101. The same details apply to tracks 102′ of disk 101′. The elements 103 having a thickness $t$ consist of a number $n$ of sections, illustratively, shown as 103A through 103D and the tracks corresponding thereto are numbered 102A through 102C. It should be noted that a magnetic track designation corresponds to a gap between two elements; for example, the gap having a width $w$ between element sections 103A and 103B results in track 102A. Referring first to FIG. 2A, there is shown the standard tape head-to-magnetic-track configuration wherein the head is mounted transverse ($\theta_0$=0°) to the magnetic tape or disk motion. The tracks 102A through 102C will have a width equal to the distance W between each of the head elements 103A through 103D (called "gap length" in the prior art) and a spacing equal to the cross-section $x$ of the elements 103A through 103D (called "gap width" in the prior art). Conventionally constructed prior art heads orient their gaps along axis 90° removed from the axis shown. Referring now to FIG. 2B, if the head element 103 is placed parallel to the track notion, ($\theta_{90}$=90°), the single track 102 will have a width equal to the thickness $t$ of the head element 103. (This is the gap orientation in a conventional head.) Referring to FIGS. 2C through 2E, a variety of head angles progressing from $\theta$ 1 through $\theta$3 is shown. It can be seen that as the angle increases from more than 0° toward less than 90°, the track width ($t \sin \theta$) increases and the total space between $n$ tracks ($W \cos \theta - n\, t \sin \theta$) decreases.

FIG. 2C shows a skew angle $\theta$1 of approximately 45° where the track width and intertrack gap are approximately equal and the recorded track is slightly less than the gap width (thickness $t$ of the element 103). In FIG. 2D, the spacing between the tracks at $\theta$2 is practically zero, and the track widths occupy almost the entire space upon the media available for recording and reading. If the skew angle is approximately 27.5°, the tracks become contiguous giving approximately 500 tracks per inch for an element thickness of approximately 0.002 inch and a center to center spacing of 0.004 inch. Referring to FIG. 2E, where the head angle is increased to $\theta$3, the tracks 102A through 102C overlap.

In FIG. 2E, a skew angle of $\theta$3=75° causes the tracks to overlap. Each of the tracks is approximately 0.001 inch wide and there are about 1,000 per inch. An increase in the skew angle can achieve up to 2,000 tracks per inch. It would be expected by one skilled in the art that if the recording gaps are displaced by 0.004 inch and the gaps are driven by high currents on the order of 1 ampere, adjacent tracks would be excited and crosstalk would occur. However, in testing the invention with alternate tracks driven at 500 and 1,000 flux changes per inch, respectively, with one ampere of write current it was observed that signals recorded on adjacent tracks were clearly defined and undisturbed.

Figure 3A:
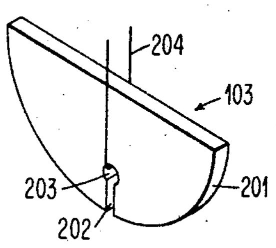
FIGS. 3A through 3C show various configurations of batch fabricated magnetic read/write head elements.
Figure 3B:
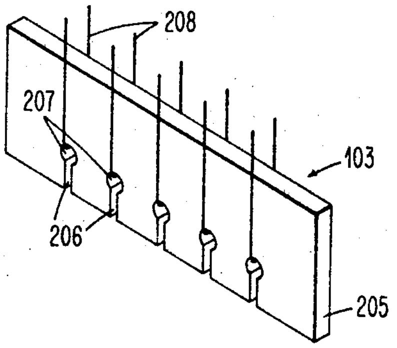
Figure 3C:
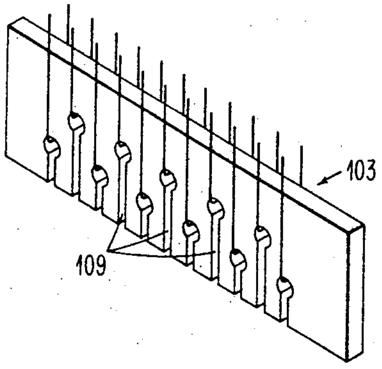

FIGS. 3A through 3C show a number of embodiments of batch fabricated elements 103 intended for mounting in transducers 100, 100′ and 100″ of FIGS. 1A–1C. Referring first to FIG. 3A, a single track foil or laminated head element is shown. The material 201 is a magnetic material such as HyMu 80, Mo Permalloy or equivalent, having a thickness ranging from 0.00025 inch to 0.002 inch. The head element includes an aperture 203 having a diameter on the order of 0.0025 inch and a gap running from the aperture to the edge of the material 201 having a gap width on the order of 0.0002 inch. A winding 204 passes through the aperture 203. While a single winding 204 is shown, it is possible to loop the winding 204 through the aperture 203 any number of times desired to give greater signal strength for both recording and reading.

The concept of FIG. 3A may be extended to a plurality of parallel tracks as shown in FIG. 3B. Each of the tracks has a corresponding aperture 207 and a slot forming a gap 206 in the material 205. Windings 208 pass through each of the apertures 207 in the manner previously described with reference to FIG. 3A.

Similarly, FIG. 3C shows an alternative scheme permitting closer placement of gaps with limited structural weakening of the material by the apertures. Extension of this concept to thin film technology is also possible by placing conductive and magnetic elements on a substrate, as will be explained below with reference to FIG. 4.

In the case of transverse motion, as shown in FIG. 2A, while the tracks can be made very narrow (on the order of 0.00025 inch through 0.0005 inch wide), the track pitch is limited by the thickness of the wires 208 used to drive the elements 103. Thus, for wire 0.002 inch thick, the center to center spacing is limited to 0.004 inch and 250 tracks per inch. On the other hand, as shown in FIG. 2B, the track width may be limited only by the element thickness, that is 0.001 inch through 0.002 inch, to give 500 to 1,000 tracks per inch. However, this creates the problem that all the tracks are powered in the same plane and each succeeding track therefore erases the data recorded by the preceding track. Thus, one of the positions shown in FIGS. 2C–2E will be preferable.

Figure 4:
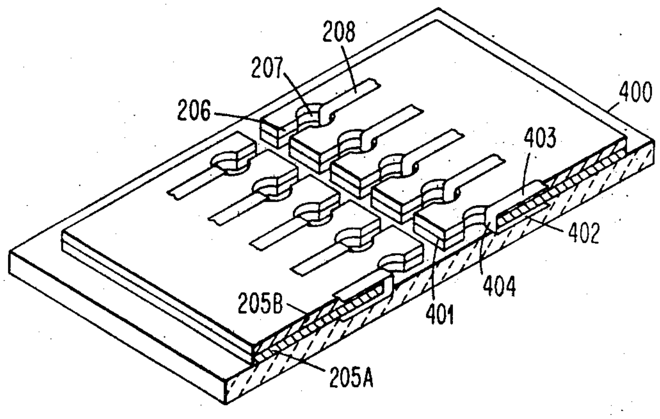
FIG. 4 is a detailed view showing construction of one embodiment of FIG. 3B.
Figures 5A, 5B:
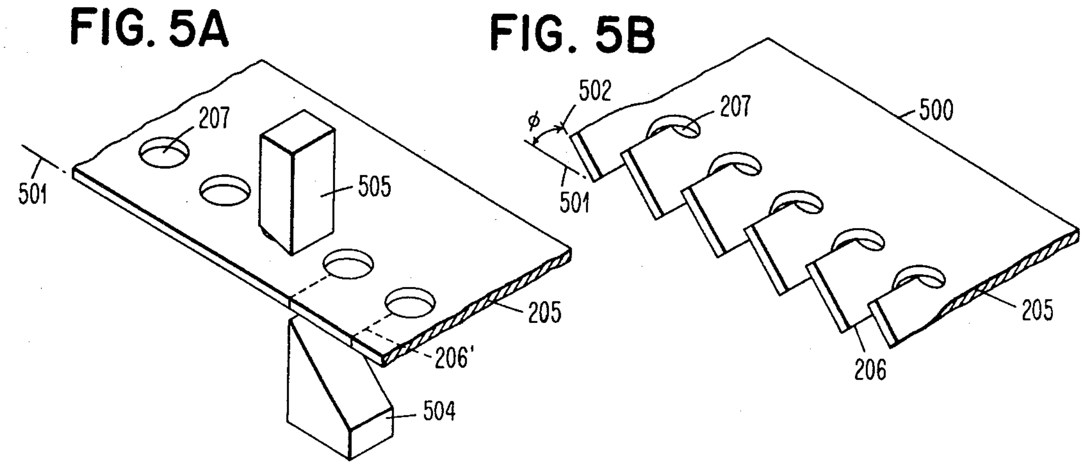
FIGS. 5A through 5C show several techniques for forming gaps in magnetic read/write head elements of the type shown in FIG. 3B.
Figure 5C:
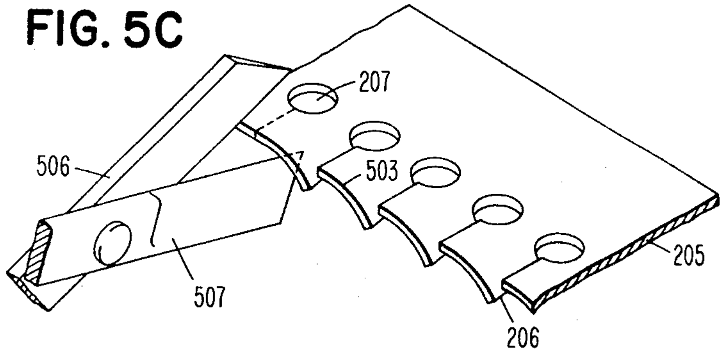
Figure 6:
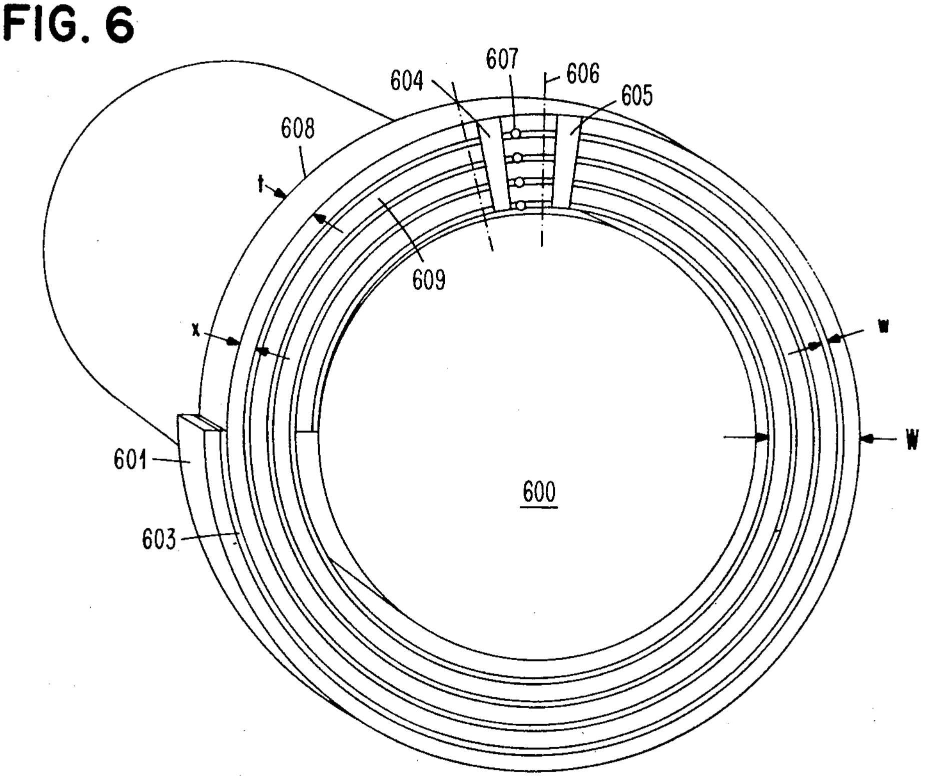
FIG. 6 shows an alternative technique for manufacturing the magnetic read/write head element of FIG. 3B.

Manufacturing Methods (FIGS. 4–6)

Magnetic head elements referred to in FIGS. 1–3 are manufactured by a number of techniques including thin film evaporation, lamination, shearing, etc. Referring to FIG. 4, thin film deposition or foil bonding techniques can form head elements of the type shown in FIG. 3B. A substrate 400 comprising an insulating material such as glass carries an insulating layer 205A and a magnetic material 205B. A winding 208 passes through apertures 207 and gaps are formed by slots 206 extending from the aperture 207 to the front surface 401 of the head element. The winding 208 is formed in three sections including a bottom section 402, a top section 403 and a center section passing through the aperture 207. The normal thin film construction steps include evaporation of the conductor 402 on the substrate 400 followed by evaporation of the insulating and magnetic layers in order. The apertures and the slots may then be etched and the conductor 404 and 403 added by appropriate masking, evaporation and etching steps. There is interposed a variety of spraying, oxidizing and glassing steps well known in the art. Prior to utilization of the head element, it is removed by shearing along a line through front surface 401. An alternative technique for manufacturing the head of FIG. 4 uses a laminated foil material, comprising insulator 205A and magnetic material 205B, and etching and deposition steps otherwise similar to those previously described.

Referring now to FIGS. 5A and 5B, an alternative technique for forming the slots 206 will be explained. The material used to form the heads may be the magnetic material 205B shown in FIG. 4 or it may comprise a sandwich 205 including an insulator and a magnetic material. In either case, the material is covered with a masking resist. The first step in the manufacture of the slots is to define a line, from the aperture 207 to the edge 501 of the material 205, along which the slots will be formed. A punch 504 and die 505 are mated along each of the lines 206' to form the gaps 206 as shown in FIG. 5B. The successive die and punch operations skew lines 502 relative to the base line 501 at an angle $\phi$. A single punch 504 and die 505 may be used or a plurality of punches and dies may be simultaneously applied to the material 205. In each case, the surface 501 will be broken up into successive segments having an angle $\phi$ relative to the original base line 501. The material 205 is then etched to increase the ultimate slot size and smooth the slot edges. Next, the resist covering the material 205 is stripped from the part. The part 205 is then flattened, annealed and the surface is, if desired, oxidized. The end result is a stress free head element having a gap 206 which is evenly formed.

Referring now to FIG. 5C, a technique similar to the one described with reference to FIGS. 5A and 5B utilizes a scissoring action of opposed blades 506 and 507. The effect is to form a curved surface 503 as opposed to the flat surface in the technique of FIGS. 5A and 5B. The subsequent steps however, are identical to those previously described.

Alternative techniques for forming gaps and other dimensions exist. For example, a line may be scratched from the aperture to the edge and the slot etched, cut, sawed, laser, or electro-discharge machined or electron beam machined, etc. Since the material is originally covered with a resist, the etchant attacks only the scratched area. The apertures may be formed similarly or by countersinking the surface and etching or by punching the holes entirely.

Referring now to FIG. 6, still another technique for manufacturing a head element of the type shown in FIG. 3B is shown. An annealed or unannealed flat magnetic foil strip or wire 601 such as HyMu 80 or its equivalent having a thickness $t$ and cross-section $x$ is plated by evaporation or some other appropriate technique with a gap material 603, such as copper, to a width $w$. It is possible to plate a width of one-half $w$ on each side of the strip 601, though the strip is shown plated on only one side. The plated strip 601 is coiled about a mandrel 600 having a diameter $d$ which is much larger than the wire cross-section $x$. The wound strip may then be annealed, for example at approximately 1,200° Fahrenheit, until light diffusion bonding occurs at the interface between materials 601 and 603. The face 609 of the wound strip is then appropriately masked off to permit the plating of additional magnetic material 604, 605, etc.; for example, permalloy, as successive points around the wound strip. Holes 607 are then drilled, punched, or otherwise formed by techniques known in the art (such as the use of laser beams) and the outside face is potted to permit removal of the mandrel. A wire saw or laser may then be used to cut the successive sections along lines 606, etc. from the wound strip, and the back 608 is lapped to produce the required track width. The manufacturing technique produces a magnetic head having gaps $w$ wide, with a pitch between the gaps of $x + w$ and a track width of $t$ or less.

TESTING TECHNIQUES (FIGS. 7–8)

Figure 7A:
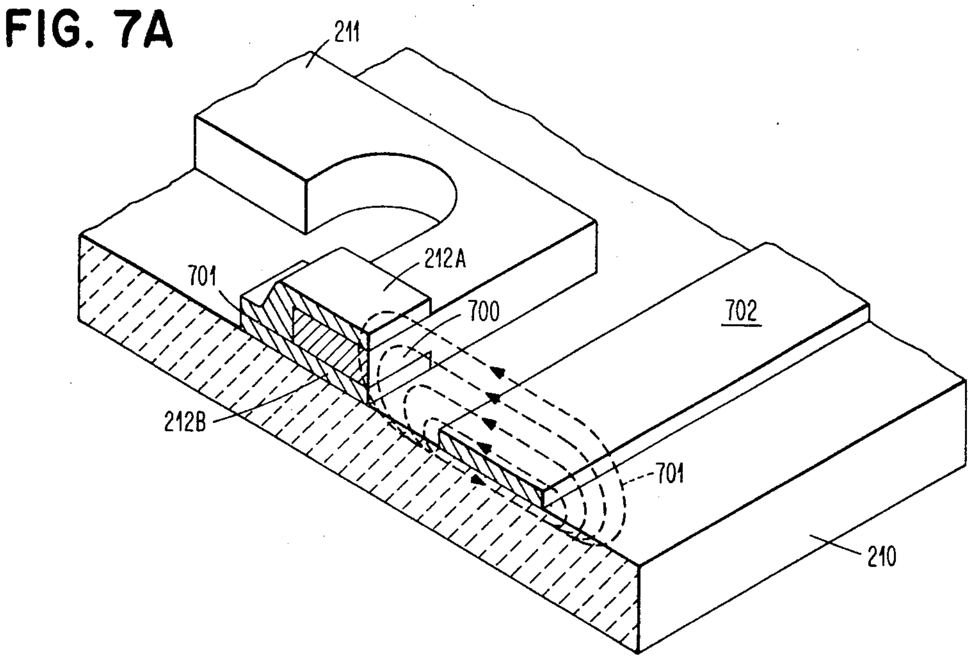
FIG. 7A shows the positioning of a magnetic read/write head element for the purpose of testing it during manufacture.

Referring first to FIG. 7A, there is shown an illustrative horseshoe single turn magnetic head which may be tested during the manufacturing process and before final assembly. While shown for a thin film head element, to illustrate its broad applicability, the testing technique applies equally to the head elements of FIGS. 3A through 3C and particularly FIG. 4.

Figure 7B:
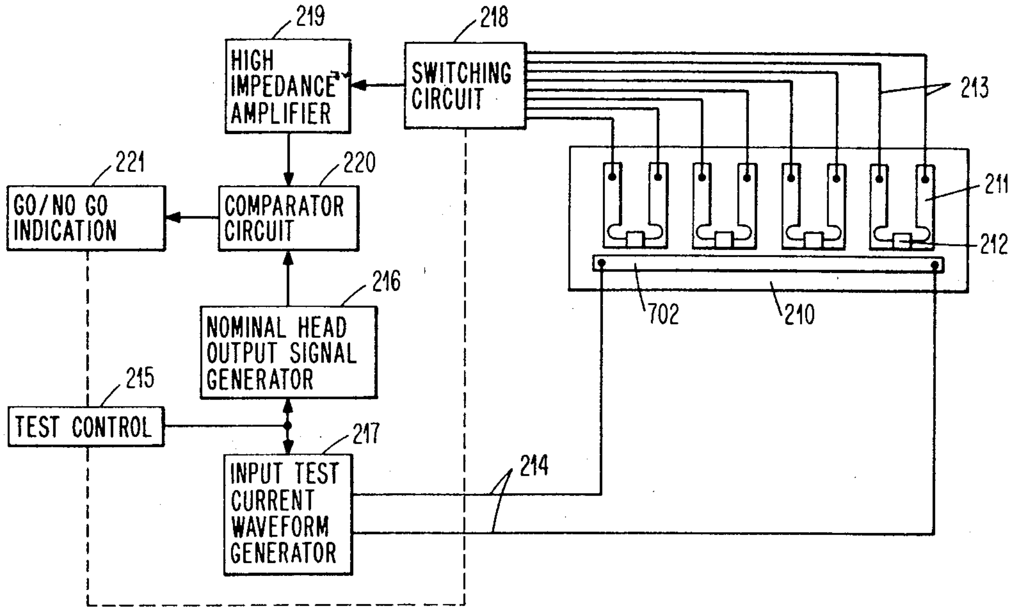
FIG. 7B is a systems diagram showing means for testing the head element of FIG. 7A.

A single turn magnetic head is formed on substrate 210 using conventional prior art techniques. The head comprises a conductor 211 and a horseshoe of magnetic material 212A and 212B forming a front gap 700 and back gap 701. A plurality of head elements is placed on substrate 210 together with a strip of conductive material 702 which is used for testing all of the head elements to determine early in the manufacture if there are any defects in the head elements. For testing purposes, the strip 702 should be in close proximity to the front gap 700 as illustratively shown in FIG. 7A. In practice, an extension of the head element normally occupies the space between the head element and the strip. This extension may be removed before testing to expose the front gap, as shown, or as a final step in the manufacture. Referring to FIG. 7B, a plurality of head elements 211 on a substrate 210 is associated with the conductor strip 702 which is connected to an input test current waveform generator 217. The head elements 211 are connected via wires 213 to a switching circuit 218 which connects each of the head elements 211 in turn to a high impedance amplifier 219. If desired, all of the head elements 211 may be simultaneously connected to separate high impedance amplifiers to eliminate the need for the switching circuit 218. When a known electrical current is supplied on wires 214 to the strip 702, a magnetic field will surround the strip 702 causing a current to be induced in each of the head elements 211. This causes a current to flow in the wires 213 which current can then be compared with the original known current to determine if the head elements 211 are within desired tolerances. It will be understood that a similar effect may be achieved by supplying current on wires 213 and monitoring the result on wires 214. In operation, the known current is supplied by a nominal head output signal generator 216 which provides a standard test signal to the input test current waveform generator 217 and to a comparator circuit 220. The input test current waveform generator 217 supplies a signal to the test strip 702 and the comparator circuit 220 receives the resulting signal from the head element 211 by way of the switching circuit 218 and the high impedance amplifier 219. A go-no-go indication is generated by a circuit 221 connected to the comparator circuit 220. For example, if the signal received by the high impedance amplifier 219 is within a given tolerance of the nominal head output signal from the generator 216, the circuit 221 may indicate that all the heads on the substrate 210 are satisfactory. Control of successive tests is performed by a test control 215 which causes a separate input test current waveform to be generated by the circuit 217 for each of the successive heads 211 tested by the switching circuit 218. The successive tests are accumulated under control of the test control 215.

Figure 8A:
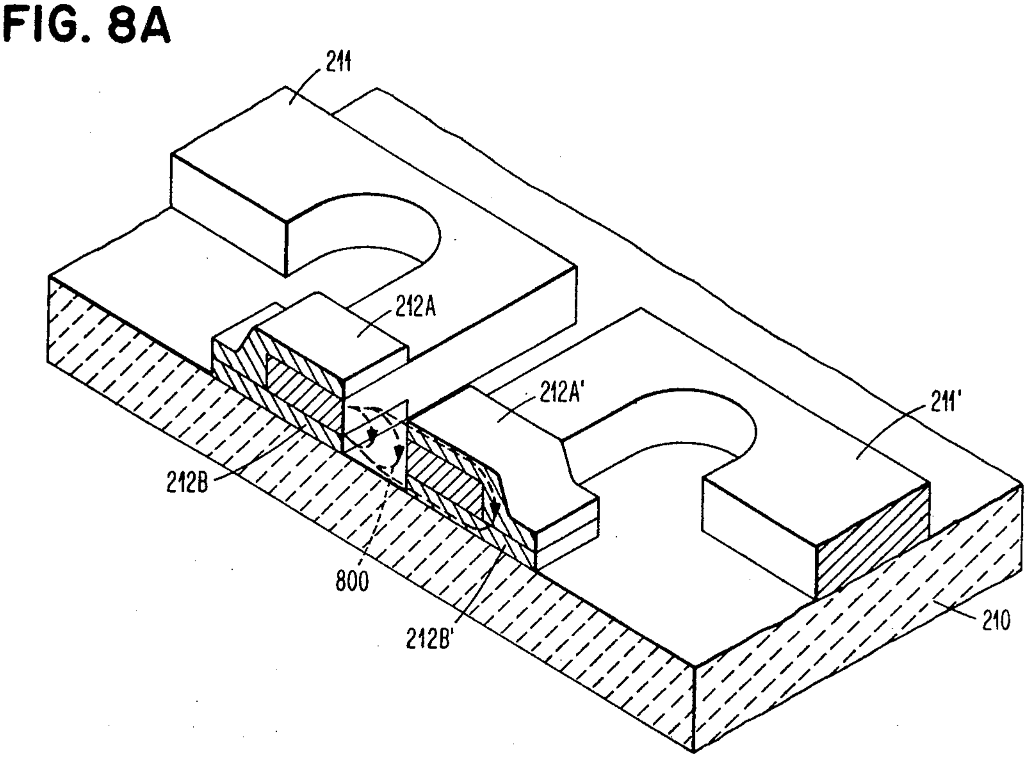
FIGS. 8A and 8B show an alternative scheme for testing magnetic read/write head elements.
Figure 8B:
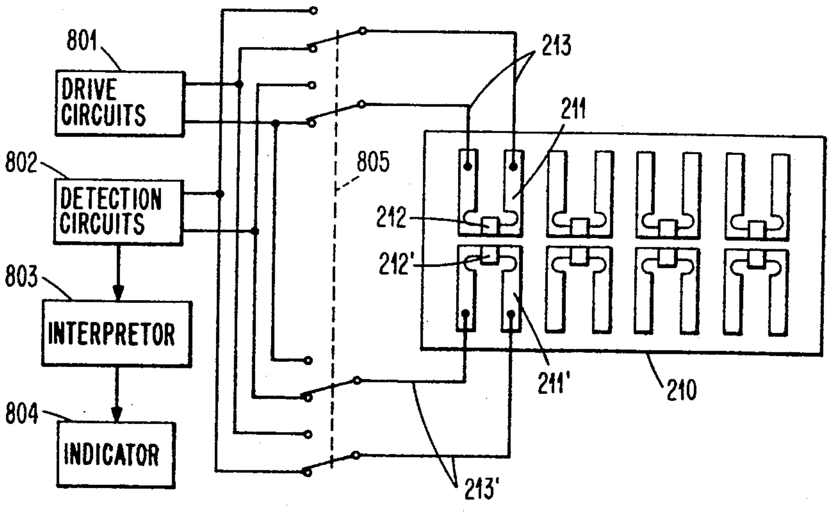

Referring now to FIGS. 8A and 8B, an alternative embodiment for testing heads is shown. The strip 702 utilized for the tests of FIG. 7A may be eliminated by forming the head elements in complementary rows on the substrate 210. Alternate rows of head elements are oriented in such a way that the gap area of heads in the two rows are in close proximity, for example, less than one mil spacing. The conductors 211 and 211' are associated with magnetic material 212A and 212B and 212A' and 212B' on the substrate 210. The structures may be deposited with separation between the elements of the two rows achieved by depositing the elements up to a line of photoresist, for example. Alternatively, the structure may be deposited with the two rows combined and then later separated by cutting or by etching. In either case, the current is applied to one row of the heads and magnetic field 800 will induce a current to flow in another row of heads. This is shown in more detail in FIG. 8B where two rows of heads are mounted on a substrate 210 and switches (not shown) connect pairs of head elements to drive circuits and detection circuits. If desired, this switch may be eliminated by connecting each complementary pair of head elements to separate drive and detection circuits. Each head element 211 and 211' is connected to circuits 801 and 803 in turn by switch 805. In operation, the drive circuit 801 provides a signal to the head element 211 causing a current to flow therein which causes a magnetic field to induce an electric current in the complementary head element 211' which current is carried by wires 213' to the detection circuit 802. Interpreter 803 recognizes whether the detected signal is within accepted tolerances and an indicator 804 accumulates successive tests to indicate whether all of the head elements on the substrate 210 are within accepted tolerances. It will be evident to one skilled in the art that all of the head elements in one row may be driven simultaneously and all of the head elements in the other row may be monitored simultaneously, or all of the elements in one row may be driven simultaneously and one element at a time in another row may be monitored. Also, it is possible to exchange the circuits of FIG. 7B and FIG. 8B to provide similar interpretive data. It is not necessary that the head elements tested be accumulative though it is desirable to determine whether all of the head elements on a given substrate are satisfactory. It is, however, possible to utilize information indicating which of the head elements are not satisfactory so that subsequent manufacturing operations may remove the unsatisfactory elements, replace them, or utilize the substrate in such a manner as to ignore sections containing unsatisfactory elements. A variety of tests may be performed in addition to the ones described, for example, the output as a function of the driving frequency, output as a function of driving current, the shape of the output current along the easy-hard access, secondary shorts, inductance of the primary, crosstalk tests, etc. The same tests may also be applied to other types of heads previously described.

While the invention has been particularly shown and described with reference to preferred embodiments thereof, it will be understood by those skilled in the art that various changes in form and details may be made therein without departing from the spirit and scope of the invention.

What is claimed is:

1. In a combination for testing a plurality of magnetic head elements, arranged on a substrate, during manufacture and prior to separation and final processing, wherein the combination includes:

drive circuits, connectable to one or more magnetic head elements and responsive to a drive current, for causing said elements to generate magnetic fields;

detection circuits connectable to one or more magnetic head elements for monitoring, as electric signals, the magnetic field caused by said drive circuits;

control means, interconnecting said drive and detection circuits with the head elements for initially enabling the drive circuits to supply current to a selected number of elements and the detection circuits to initially monitor a selected number of different elements;

a source of electric current, indicative of acceptable values of current;

an interpreter, associated with said detection circuit and source for comparing the monitored electric currents to acceptable values of currents; and indicating means, connected to said interpreter for indicating when the monitor and acceptable currents bear a predetermined relationship.

2. The combination of claim 1 wherein the control means is additionally operable to subsequently cause the detection circuits to monitor initially driven elements and the drive circuits to drive initially monitored elements.

3. The combination of claim 2 wherein the head elements are arranged in rows and the drive circuits and detection circuits are, at any one time, connected to elements in different rows.

4. In a combination for testing a plurality of magnetic head elements, arranged on a substrate, during manufacture and prior to separation and final processing, wherein the combination includes:

first circuits, connectable to one or more magnetic head elements and responsive to an input signal for generating fields from said elements;

second circuits connectable to one or more magnetic head elements for monitoring, as output signals, the field caused by said first circuits;

control means, interconnecting said first and second circuits with the head elements for enabling the first circuits to supply input signals to a selected number of elements and the second circuits to monitor a selected number of elements other than those elements connected to the first circuits;

a source of test signals, indicative of acceptable values of output signals;

an interpreter, associated with said second circuits and source for comparing the output and test signals; and indicating means, connected to said interpreter for indicating when the output and test signals bear a predetermined relationship.

5. The combination of claim 4 wherein the control means is additionally operable to subsequently cause the first and second circuits to be connected to each others' elements.

6. The combination of claim 5 wherein the head elements are arranged in rows and the first circuit and second circuits are, at any one time, connected to elements in different rows.

7. The method for testing, during manufacture, batch-fabricated magnetic transducer elements on a surface, including the steps of:

connecting a source of electric signals to a number of first elements;

generating a magnetic field, intersecting other elements as a result of the electric signals;

connecting means for detecting electric signals to a number of second elements intersected by the magnetic field;

comparing the detected electric signals to reference limits; and identifying those elements having a detected signal within the reference limits and those outside the limits.

8. The method of claim 7 wherein there is the additional step of:

reversing the connections to connect the electric signals to the second elements and to detect signals from the first elements.

9. The method for testing, during manufacture, batch-fabricated magnetic transducers formed on a surface as discrete elements having at least one magnetic and one conductive layer, including the steps of:

connecting a source of electric signals to the conductive layers of a number of first elements;

generating a magnetic field, intersecting the conductive layers of second elements as a result of the electric signals;

detecting electric signals from a number of second elements intersected by the magnetic field;

comparing the detected electric signals to reference limits; and identifying those elements having a detected signal within the reference limits and those outside the limits.

10. The method of claim 9 wherein there is the additional step of:

reversing the connections to connect the electric signals to the second elements and to detect signals from the first elements.

* * * * *